(12) United States Patent
Morimitsu et al.

(10) Patent No.: US 8,303,858 B2
(45) Date of Patent: Nov. 6, 2012

(54) PHOTOCHROMIC POLYMER WITH BINDER

(75) Inventors: Kentaro Morimitsu, Mississauga (CA); Adela Goredema, Mississauga (CA); Gabriel Iftime, Mississauga (CA); Peter M. Kazmaier, Mississauga (CA); Roger E. Gaynor, Oakville (CA)

(73) Assignee: Xerox Corporation, Norwalk, CT (US)

( * ) Notice: Subject to any disclaimer, the term of this patent is extended or adjusted under 35 U.S.C. 154(b) by 31 days.

(21) Appl. No.: 12/719,192

(22) Filed: Mar. 8, 2010

(65) Prior Publication Data

US 2011/0215283 A1  Sep. 8, 2011

(51) Int. Cl.
  *G02B 5/23* (2006.01)
  *B41M 5/20* (2006.01)
  *B41M 5/24* (2006.01)

(52) U.S. Cl. ........ 252/586; 427/145; 427/160; 503/200; 503/201; 503/218; 503/223; 528/185

(58) Field of Classification Search .................. 252/586; 427/145, 160; 503/200, 201, 218, 223; 528/185
See application file for complete search history.

(56) References Cited

U.S. PATENT DOCUMENTS

| | | | |
|---|---|---|---|
| 3,918,972 A * | 11/1975 | Evens et al. | 430/337 |
| 4,026,869 A | 5/1977 | Evens et al. | |
| 6,067,185 A | 5/2000 | Albert et al. | |
| 7,108,954 B2 * | 9/2006 | Nishimura et al. | 430/270.1 |
| 2010/0227760 A1 * | 9/2010 | Morimitsu et al. | 503/201 |

OTHER PUBLICATIONS

U.S. Appl. No. 12/400,276, filed Mar. 9, 2009.
U.S. Appl. No. 12/627,882, filed Nov. 30, 2009.

* cited by examiner

*Primary Examiner* — Bijan Ahvazi
(74) *Attorney, Agent, or Firm* — MH2 Technology Law Group LLP

(57) ABSTRACT

The present disclosure relates to the process of making a photochromic composite having a photochromic polymer and a binder polymer. The photochromic polymer is made by solution polymerization of the photochromic monomer and two monomers in the presence of a base and the binder polymer is made by solution polymerization of the two monomers in the presence of a base.

15 Claims, No Drawings

PHOTOCHROMIC POLYMER WITH BINDER

BACKGROUND

This disclosure relates to a reimagable and reusable medium and a method of producing the same. The reimagable and reusable medium, according to the present disclosure, is a substrate composed of a photochromic polymer and a binder polymer having a substantially similar backbone structure.

Conventional methods for producing electrophotographic reusable media entail coating a small photochromic molecule and a non-photochromic polymer binder to create a thin imaging layer of photochrome and binder on a preformed substrate, such as paper. The binder increases viscosity of the coating composition. A higher viscosity provides a thicker coating, which increases the amount of photochromic material per surface unit. An increased amount of photochromic material in the coating composition is desired for initial writability of the erasable media.

The resulting media is re-writable and reusable as a result of the reversible coloration-decoloration properties of the photochromic molecule. With conventional reusable media, ultraviolet (UV) light is used to color (or write) the photochrome in the media, and visible light and/or elevated temperatures reverse the coloration process, erasing the color of the photochrome within the media.

Conventional polymer binders such as polymethyl methacrylate (PMMA) are used in combination with photochromic monomers such as spiropyrans to form erasable media. As a result, visible images written on conventional erasable media are readable for a few hours under ambient light conditions, and are often self-erased with no effort from the user. In most cases, the self-erased erasable media are ready to be imaged again within about a day.

It is desirable, however, for the erasable media to have a longer image lifetime as well as an acceptable initial writability. It would also be desirable for an erasable medium to be readable for as long as required by the user, then erased on demand and available for subsequent re-imaging. Thus, erasable media with increased writability, longer image lifetime, and/or higher reusability as compared with conventional erasable media remain desirable.

SUMMARY

The present disclosure relates to the process of making a photochromic composite having a photochromic polymer and a binder polymer. The photochromic polymer is made by solution polymerization of the photochromic monomer and two monomers in the presence of a base and the binder polymer is made by solution polymerization of the two monomers in the presence of a base.

In embodiments, a process of the present disclosure may include contacting a first monomer with at least one photochromic monomer in a first solvent in the presence of a first base to form at least one polymer precursor and contacting a second monomer with the at least one polymer precursor in a second solvent in the presence of a second base to form a photochromic polymer.

In other embodiments, a process of the present disclosure may include contacting a first monomer with a photochromic monomer in a first solvent in the presence of a first base to form a polymer precursor, contacting a second monomer with the polymer precursor in a second solvent in the presence of a second base to form a photochromic polymer, forming a binder polymer from the first monomer and the second monomer, and combining the photochromic polymer and the binder polymer to form a photochromic composite.

In further embodiments, a process of the present disclosure may include contacting adipoyl chloride with at least one photochromic monomer in a first solvent in the presence of a first base to form at least one polymer precursor and contacting a monomer with the at least one polymer precursor in a second solvent in the presence of a second base to form a photochromic polymer.

DETAILED DESCRIPTION

The present disclosure provides for reimagable and reusable media and a method of producing the same. The reimagable and reusable media according to the present disclosure include a substrate and a photochromic composite disposed thereon. The photochromic composite includes a photochromic polymer and a binder polymer having a substantially similar backbone structure. The present disclosure also provides for a reimagable and reusable paper or image forming medium formed using a composition that is imagable and erasable by suitable exposure to light and heat (e.g., photochromism and thermochromism).

As used herein, photochromism and thermochromism, include, in embodiments, the reversible coloration of a molecule from exposure to light (electromagnetic radiation) and heat (thermal radiation), respectively. Photochromic molecules undergo structural and/or electronic rearrangements when irradiated with UV light that converts them to a more conjugated colored state. In the case of photochromic molecules, the colored state may typically be converted back to the original colorless state by irradiating the molecules with visible light. In some cases thermal energy may also be used to remove color from a photochrome.

The photochromic polymer exhibits a reversible transition between a colorless and a colored state. Exposure of the photochromic composite of the present disclosure to a first stimulus such as a combination of electromagnetic and thermal radiation causes the photochromic material in the photochromic polymer to convert from the colorless state to a colored state. A colored state, in embodiments, refers to the presence or absorption of visible wavelengths by the medium. A colorless state, in embodiments, refers to the complete or substantial absence of visible wavelengths or the complete or substantial absence of absorption in the visible region of the spectrum (from about 400 to about 800 nanometers) by the medium.

The present disclosure also provides for photochromic polymers that allow the image state to be locked-in for extended periods of time, by constraining the physical rearrangement of the photochromic material between the colorless and colored states. That is, the more rigid structure of the polymer chain prevents the photochromic material from shifting between isomeric states, because the shifting requires a physical rearrangement of the polymer chain, and thus more energy.

In embodiments, writing of a photochromic reimagable paper may be accomplished by exposure to UV light at a specific range of temperatures, and erasure of a photochromic reimagable paper may be accomplished by heating the paper. In embodiments, heating of the photochromic polymer at or near its glass transition temperature, in combination with exposure to UV light, allows the image to be written, as desired, in a short time period, in embodiments from about 30 milliseconds to about 1 minute. The heating softens the polymer, allowing easier physical rearrangement of the polymer chain and the photochromic material. When the polymer is in the heated state, an image may be written by exposure to suitable irradiation such as UV light, followed by cooling of the polymer to lock-in the image. Likewise, when the polymer is in the heated state, an image may be erased either by heating to a higher temperature, followed by cooling of the polymer to lock-in the erased image. The erasure may thus be conducted in a short time period, in embodiments from about 2 to about 10 seconds at about 100° C. and about 4 minutes at about 70° C.

In embodiments, the photochromic polymer may be dispersed in another, non-photochromic polymer binder. Such an additional polymer binder may be desired, for example, depending on the properties, characteristics, and the like of the photochromic polymer. Of course, it should be understood that an additional polymer binder may not be required in some embodiments, as the photochromic polymer may itself function as a binder material.

Photochromic Polymer

The photochromic polymer may be any suitable polymer that has one or more photochromic molecules or compounds bound to a polymer, in embodiments bound to a polymer backbone. The photochromic polymer may thus include one or more photochromic molecules or compounds covalently bound to the polymer backbone. The photochromic moiety may be added to the polymer chain during polymerization, in the form of reactive units, monomer units, or the like, or added to an already formed non-photochromic polymer material through known chemical functionalization reactions.

Where multiple photochromic molecules or compounds are present in the polymer chain, the multiple photochromic molecules or compounds may be the same or different. Likewise, the photochromic polymer used in forming the imaging layer may include only one type of photochromic polymer, or may include a mixture of two or more different types of photochromic polymers.

As shown in the following Formula I, the photochromic polymer may include at least one photochromic moiety covalently bound to a backbone portion.

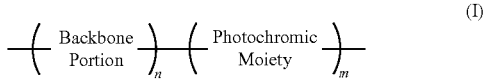

where n is from about 0 to about 1000, in embodiments from about 5 to about 100, and m is from 1 to about 1000, in embodiments from about 5 to about 100.

In embodiments, any suitable non-photochromic monomeric or polymeric material can be selected for forming the non-photochromic part of the photochromic polymer of Formula I, i.e., the backbone portion. In Formula I, the backbone portion may be present in an amount of from 0% by weight to about 99.5% by weight of the total photochromic polymer, in embodiments from about 5% by weight to about 90% by weight of the total photochromic polymer, with n being from about 0 to about 1000, in embodiments from about 1 to about 100. The photochromic moiety may thus be present in an amount of from about 0.1% to about 100% by weight of the photochromic polymer, in embodiments from about 10% to about 50% by weight of the photochromic polymer.

In embodiments, the photochromic polymer of Formula I, including photochromic moiety covalently bound to backbone portion, can be present in an amount of from about 0.05 to about 100 percent by weight of the photochromic composite of the present disclosure, in embodiments from about 0.1 to about 70 percent by weight of the photochromic composite, in other embodiments from about 1 to about 60 percent by weight of the photochromic composite.

Since the photochromic polymer is converted between its colored and colorless states through application of electromagnetic and/or thermal energy, the backbone portion and the photochromic moiety may be desirably selected such that the photochromic polymer of Formula I has thermal properties that may withstand, for example, temperatures at which images may be formed or erased. For example, the photochromic polymer of Formula I may be selected to have a glass transition temperature of from about 30° C. to about 150° C., in embodiments from about 40° C. to about 100° C., or in other embodiments from about 55° C. to about 80° C.

In embodiments, the suitable photochromic moiety may include various photochromic molecules, compounds or monomers, for example, spiropyrans, spirooxazines, chromenes, spirodihydroindolizines, spiroperimidines, azobenzenes, thioindigos, thiospiropyrans, benzos, stilbenes, bisimidazols, quinines, perimidinespirocyclohexadienones, viologens, fulgides, fulgimides, diarylethenes, hydrazines, anils, aryl thiosulfonates, and the like, as well as combinations and mixtures thereof. In embodiments, the photochromic moiety may be easily rearranged in the photochromic polymer to alter the imaging state when exposed to suitable irradiation and heat, but may be more difficult to rearrange to alter the imaging state when heat is removed.

One example of a suitable photochromic moiety may include a monomer having the following Formula II.

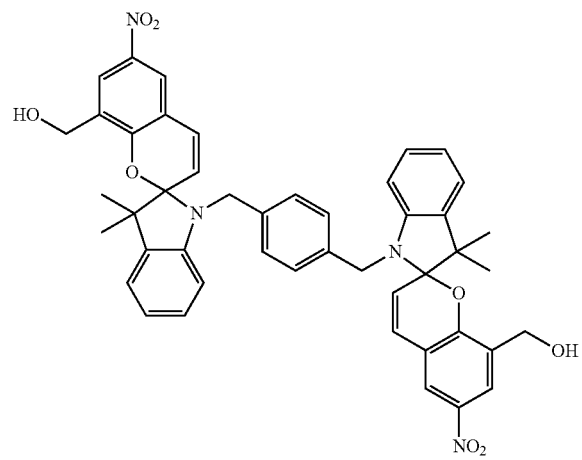

Any suitable non-photochromic polymer materials may be selected for forming the non-photochromic part (e.g., backbone) of the photochromic polymer. Suitable polymers include copolymers that may be formed from first and second monomers. The first monomer may be diacyl chlorides, diacids, dimethyl esters of diacids, or anhydrous cyclic esters of such diacids such as oxalyl, malonyl, succinyl, glutaryl, adipoyl, pimeloyl, suberoyl, azelaoyl, sebacoyl, fumaryl, terephthalic, isophthalic, phthalic, and mixtures thereof, wherein the alkyl portion may be a straight, branched or cyclic, saturated or unsaturated, substituted or unsubstituted, having from about 1 to about 40 carbon atoms, as well as substituted or unsubstituted aromatic or heteroaromatic groups.

The second monomer may include bisphenols or diols such as bisphenol A, bisphenol B, bisphenol C, bisphenol F, bisphenol M, bisphenol P, bisphenol AP, bisphenol Z, ethylene glycol, propylene glycol, butylene glycol, pentylene glycol, hexylene glycol, heptylene glycol, diethylene glycol, dipropylene glycol, cyclohexyldimethanol, bisphenol A ethoxylate, bisphenol A propoxylate and mixtures thereof, wherein the alkyl portion may be a straight, branched or cyclic, saturated or unsaturated, substituted or unsubstituted, having from about 1 to about 40 carbon atoms, as well as substituted or unsubstituted aromatic or heteroaromatic groups.

In embodiments, the alkyl portion can include homologous series with a general formula of $C_nH_{2n}$, where n is the number of carbon atoms, in embodiments from about 1 to about 40, in embodiments from about 2 to about 8.

In embodiments, a suitable photochromic polymer of Formula I, formed from a polymer backbone and photochromic moiety, can include a photochromic polymer having the following general Formula III.

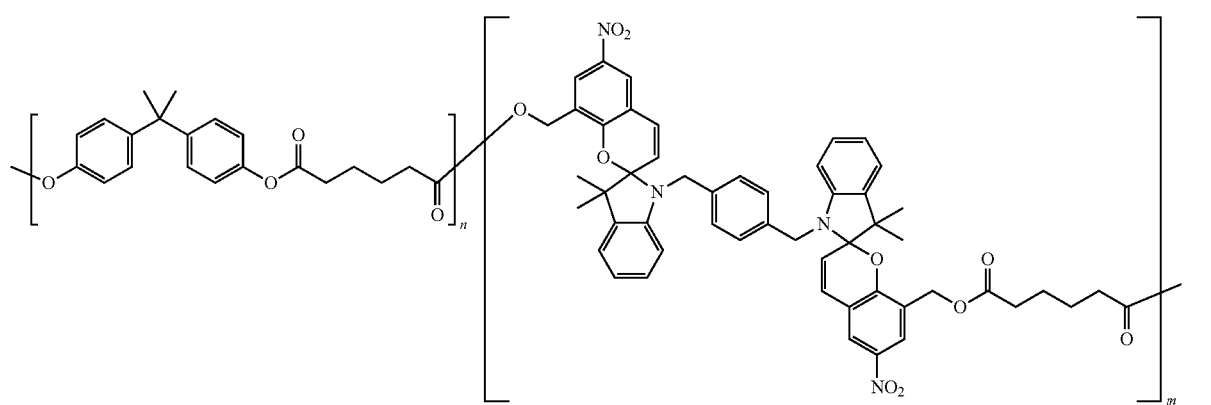

where m is from about 1 to about 1000, in embodiments from about 5 to about 100, and n can be from about 0 to about 1000, in embodiments from about 5 to about 100. An exemplary backbone of Formula III can thus have the following general Formula IV.

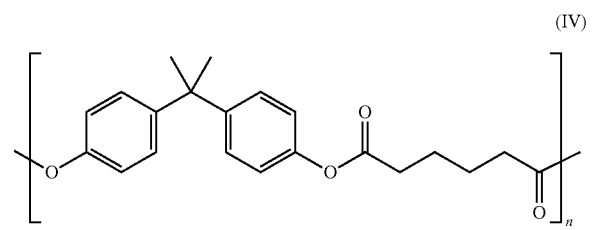

where n is from about 1 to about 1000, in embodiments from about 5 to about 100.

In embodiments, when the photochromic polymer of Formula III is used, the polymer binder can be a polyester-type polymer similar to the backbone portion of Formula IV.

The photochromic polymer may be formed using various polymerization methods, such as interfacial (e.g., suspension) and solution polymerization. In interfacial polymerization, the photochromic and backbone moieties may be dissolved in a solvent, such as dichloromethane, prior to polymerization in an aqueous solution as described in co-pending U.S. patent application Ser. No. 12/400,276, filed Mar. 9, 2009, entitled "Reimagable and Reusable Medium and Method of Producing and Using the Reimagable and Reusable Medium" and U.S. patent application Ser. No. 12/627,882, filed Nov. 30, 2009 and entitled "Erasable Media with Binder," the entire disclosures of each of which are hereby incorporated by reference in their entirety. For interfacial polymerization, the aqueous solution may be an ionic solution of sodium hydroxide and other suitable salts. For solution polymerization, polymerization may be carried out in any number of suitable solvents such as dichloromethane, chloroform, tetrachloromethane, benzene, toluene, xylene, and other chlorinated or non-chlorinated hydrocarbons in the presence of a base, which may be triethylamine, pyridine, 1,8-Diazabicyclo[5.4.0]undec-7-ene or 4-(dimethylamino) pyridine. The photochromic polymer can be prepared using the synthesis shown below:

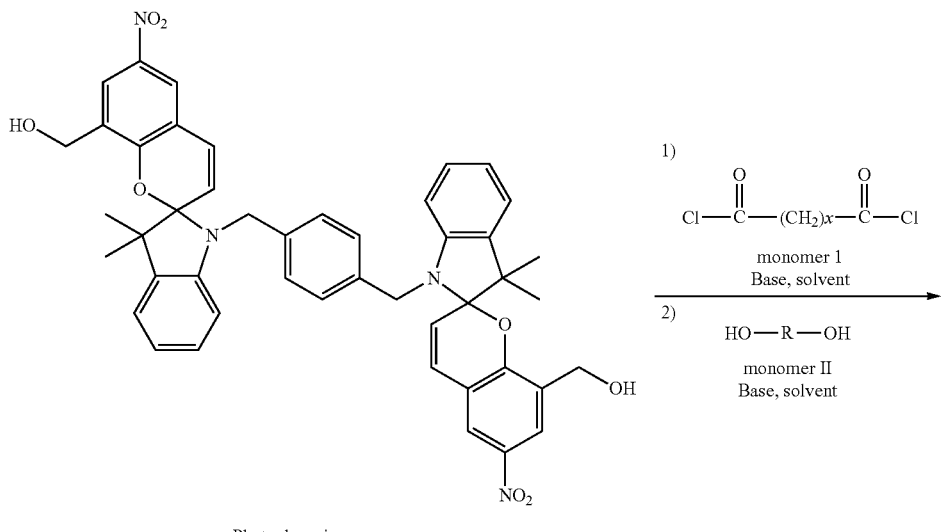

Photochromic monomer

-continued

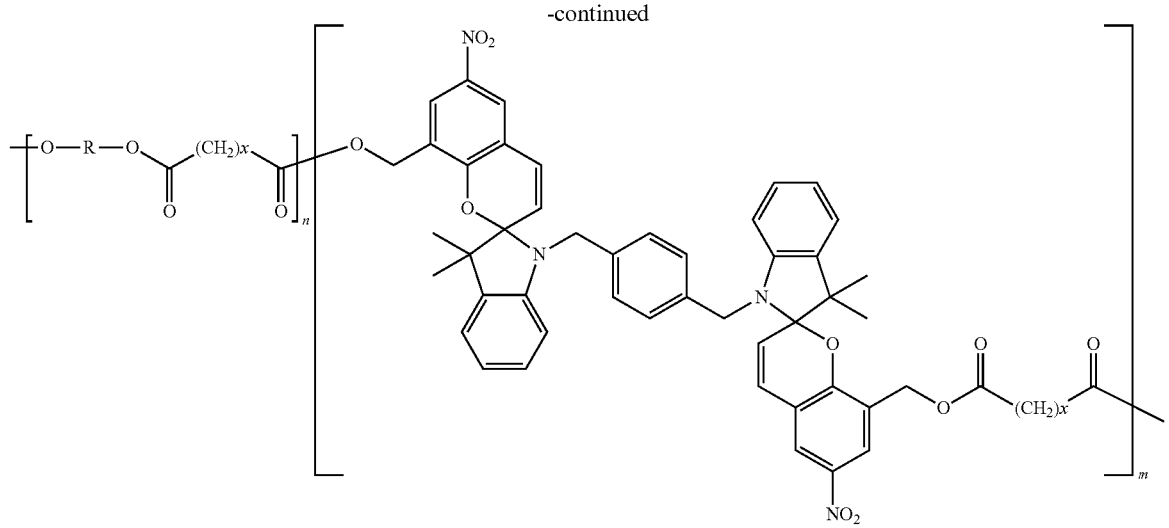

A first monomer can be reacted with a photochromic monomer at temperatures of from about −80° C. to about 125° C. in the presence of a base and a solvent. Thereafter, the resulting product can be reacted with a second monomer at temperatures of from about −80° C. to about 125° C. in the presence of a base and a solvent. The reaction mixtures may be cooled or heated to any desired or effective temperatures. In embodiments, the reactions may occur at temperatures from about 0° C. to about 25° C.

Examples of suitable first monomers include pimeloyl chloride, adipoyl chloride, succinyl chloride, glutaroyl chloride or any suitable diacid chloride as well as combinations thereof. Examples of second monomers include bisphenol A, bisphenol B, bisphenol C, bisphenol F, bisphenol, F, bisphenol M, bisphenol P, bisphenol AP, bisphenol Z, bisphenol A propoxylate, bisphenol A ethoxylate or any other suitable diols as well as combinations thereof.

In the first monomer reaction, the first monomer and the photochromic monomer are reacted to form a polymer precursor. The first monomer and the photochromic monomer may be present at a molar ratio from about 0.005 moles of the photochromic monomer per every one mole of first monomer, to about 0.5 moles of the photochromic monomer per every one mole of the first monomer. The base is present in any desired or effective amount. In embodiments, the base may be present with the photochromic monomer at a molar ratio from about 1:1 to about 2:1. The solvent may be present in any desired or effective amount. In embodiments, the solvent may be present with the first monomer at a ratio from about one milliliter of solvent per one millimole of the first monomer to about 3 milliliter of solvent per one millimole of the first monomer. The first monomer and the photochromic monomer may be reacted for any desired or effective period of time to form a polymer precursor. In embodiments, the reaction time may be from about 1 minute to about 10 minutes.

In the second monomer reaction, the second monomer is reacted with the polymer precursor. The second monomer and the photochromic monomer are present at a molar ratio from about 0.95 moles of the second monomer and the photochromic monomer combined per one mole of the first monomer to about 1.05 moles of the second monomer and the photochromic monomer per every one mole of the first monomer. The base may be present in any desired or effective amount together with the second monomer when the second monomer is added to the first reaction product, i.e., the polymer precursor. In embodiments, the base may be present at a molar ratio with the second monomer from about 1:1 to about 2:1. The solvent can be present in any desired or effective amount together with the second monomer when the second monomer is added to the first reaction product. In embodiments, the solvent may be present with second monomer at a ratio from about one milliliter of solvent per one millimole of the second monomer to about 3 milliliter of solvent per one millimole of the second monomer. The first monomer, second monomer and the photochromic monomer may be reacted for any desired or effective period of time. In embodiments, the reaction time may be from about 10 minutes to about 60 minutes. Thereafter, the product may be precipitated by addition of a non-solvent, such as hexane, heptane, diethylether, methanol, water, or the like, as well as mixtures thereof. The product may be recovered by filtering and other means.

Binder

As noted above, the photochromic composite of the present disclosure also includes a polymer binder mixed with the photochromic polymer of Formula I. In embodiments, the polymer binder can form a polymer matrix to disperse the photochromic polymer, wherein, in embodiments, the polymer binder is selected so that it is similar in structure to the backbone portion of the photochromic polymer of Formula I.

As used herein, a "similar" polymer or "similar type" polymer refers to polymers that differ in molecular weight, and/or polymers which may differ in chemical formulation, but fall into the same general class of chemical compounds. In embodiments "similar" or "similar type" polymers can include one or more functional groups for the same general class of chemical compounds.

Suitable examples of polymer binders include, but are not limited to, polyalkylacrylates like polymethyl methacrylate (PMMA), polycarbonates, polyethylenes, oxidized polyethylene, polypropylene, polyisobutylene, polystyrenes, poly (styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, combinations thereof, and the like. Copolymer materials such as polystyrene-acrylonitrile, polyethylene-acrylate, vinylidene chloride-vinylchloride, vinylacetate-vinylidene chloride, styrene-alkyd resins, and the like, are also examples of suitable binder materials. The copolymers may be block, random, or alternating copolymers. In some embodiments, polymethyl methacrylate or polystyrene may be used as the polymer binder, which may be desirable due to their cost and wide availability.

In embodiments, phase change materials may also be used as polymer binders. Such phase change materials may be used along with the photochromic polymer, binder and other optional additives. Phase change materials may include, for example, crystalline polyethylenes such as POLYWAX® 2000, POLYWAX® 1000, POLYWAX® 500, and the like from Baker Petrolite, Inc.; oxidized wax such as X-2073 and Mekon wax, from Baker-Hughes Inc.; crystalline polyethylene copolymers such as ethylene/vinyl acetate copolymers, ethylene/vinyl alcohol copolymers, ethylene/acrylic acid copolymers, ethylene/methacrylic acid copolymers, ethylene/carbon monoxide copolymers, polyethylene-b-polyalkylene glycol wherein the alkylene portion may be ethylene, propylene, butylene, pentylene or the like, including polyethylene-b-(polyethylene glycol)s and the like; crystalline polyamides; polyester amides; polyvinyl butyral; polyacrylonitrile; polyvinyl chloride; hydrolyzed polyvinyl alcohol; polyacetal; crystalline poly(ethylene glycol); poly(ethylene oxide); poly(ethylene therephthalate); poly(ethylene succinate); crystalline cellulose polymers; fatty alcohols; ethoxylated fatty alcohols; combinations thereof, and the like.

Formula V shows an exemplary polymer binder which may be combined with the photochromic polymer of Formula III, to form an exemplary photochromic composite of the present disclosure.

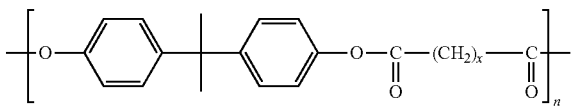

(V)

where x is from about 1 to about 10, in embodiments from about 1 to about 9, in embodiments from about 3 to about 6, and n can be from about 1 to about 1000, in embodiments from about 5 to about 100. As disclosed herein, the exemplary backbone portion of Formula IV and the exemplary polymer binder of Formula V can be "similar type polymers", regardless of the value of x in Formula V.

The binder polymer may be formed using various polymerization methods, such as interfacial (e.g., suspension) and solution polymerization. In interfacial polymerization, the copolymers (e.g., bisphenol A and backbone moieties discussed above) may be dissolved in a solvent, such as dichloromethane, prior to polymerization in an aqueous solution as described in co-pending U.S. patent application Ser. No. 12/400,276, filed Mar. 9, 2009, and entitled "Reimagable and Reusable Medium and Method of Producing and Using the Reimagable and Reusable Medium" and U.S. patent application Ser. No. 12/627,882, filed Nov. 30, 2009 and entitled "Erasable Media with Binder," the entire contents of all of which are incorporated by reference herein. The aqueous solution may be an ionic solution of sodium hydroxide and other suitable salts. In solution polymerization, polymerization may be carried out in any number of suitable solvents such as dichloromethane, chloroform, tetrachloromethane, benzene, toluene, xylene, and other chlorinated or non-chlorinated hydrocarbons in the presence of a base, which may be amines or pyridines such as triethylamine, pyridine, 1,8-Diazabicyclo[5.4.0]undec-7-ene or 4-(dimethylamino)pyridine.

The binder polymer can be prepared as shown below:

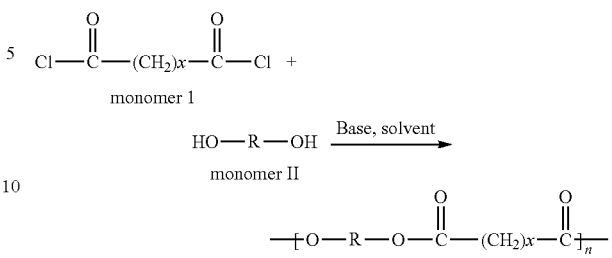

A first monomer can be reacted with a second monomer to form a binder polymer at temperatures of from about −80° C. to about 125° C. in the presence of a base and a solvent. The reaction mixtures may be cooled or heated to any desired or effective temperatures. In embodiments, the reactions may occur at temperatures from about 0° C. to about 25° C.

The first monomer and the second monomer are present at a molar ratio from about 0.95 moles of the second monomer per one mole of the first monomer to about 1.05 moles of the second monomer per every one mole of the first monomer. The base may be present in any desired or effective amount. In embodiments, the base may be present with the second monomer at a molar ratio from about 1:1 to about 2:1. The solvent may be present in any desired or effective amount together with the second monomer when the second monomer is added to the first reaction product. In embodiments, the solvent may be present with second monomer at a ratio from one milliliter of the solvent per one millimole of the second monomer to about 3 milliliter of the solvent per one millimole of the second monomer. The first monomer and the second monomer may be reacted for any desired or effective period of time. In embodiments, the reaction time may be from about 10 minutes to about 60 minutes. Thereafter, the product may be precipitated by addition of a non-solvent, such as hexane, heptane, diethylether, methanol, water, or the like, as well as mixtures thereof. The product may be recovered by filtering and other means.

Photochromic Composite

In embodiments, the photochromic composite can include the polymer binder and the photochromic polymer in any suitable amounts. For example, the polymer binder can be present in an amount of from about 0.01 to about 99.5 percent by weight of the photochromic composite, in embodiments from about 30 to about 90 percent by weight of the photochromic composite, in embodiments from about 40 to about 80 percent by weight of the photochromic composite.

In embodiments, the photochromic composite may be used to form an erasable image forming medium. The photochromic composite may be applied onto a substrate to form a photochromic layer thereon. In embodiments, the photochromic composite may be applied to the substrate in one form, and dried to another form for use. Thus, for example, the imaging composition including the photochromic polymer and solvent or polymer binder may be dissolved or dispersed in a solvent for application to or impregnation into a substrate, with the solvent being subsequently evaporated, hardened, or otherwise dried to form a photochromic composite imaging layer. Further, the photochromic composite may be applied either as a separate distinct layer to the supporting substrate, or it may be applied so as to impregnate into the supporting substrate.

In embodiments, the image forming material (photochromic polymer) is optionally dissolved or dispersed in any suitable carrier, such as a solvent, a polymer binder, or the like. Water may be used as a solvent for water soluble photochromic polymers and water soluble binders such as polyvinyl alcohol) and poly (acrylic acid). Other suitable solvents include, for example, straight chain aliphatic hydrocarbons, branched chain aliphatic hydrocarbons, and the like, such as where the straight or branched chain aliphatic hydrocarbons have from about 1 to about 30 carbon atoms (e.g., ISOPAR™ series of solvents having narrow portions of isoparaffinic hydrocarbon fractions manufactured by the Exxon Corporation of Irving, Tex.). Other suitable solvent materials include, for example, the NORPAR™ series of solvents, which include compositions of n-paraffins also available from Exxon Corporation, the SOLTROL™ series of solvents available from the Conoco Phillips Petroleum Company of Houston, Tex., and the SHELLSOL™ series of solvents available from the Shell Oil Company of The Hague, Netherlands.

Mixtures of two or more solvents, i.e., a solvent system, may also be used. When two or more different solvents are present, each solvent may be present in an equal or unequal amount by weight of, for example, from about 5% to 90%, in embodiments from about 30% to about 50%, based on the weight of all solvents. In addition, more polar solvents may also be used. Examples of more polar solvents that may be used include halogenated and nonhalogenated solvents, such as tetrahydrofuran, trichloro- and tetrachloroethane, dichloromethane, chloroform, monochlorobenzene, toluene, xylene, acetone, methanol, ethanol, benzene, ethyl acetate, dimethylformamide, cyclohexanone, N-methyl acetamide and the like.

Substrate

As desired, the substrate may be coated or impregnated on only one side, or on both sides, of the substrate. When the imaging layer is coated or impregnated on both sides, or when higher visibility of the image is desired, an opaque layer may be included between the supporting substrate and the imaging layer(s), or on the opposite side of the supporting substrate from the coated imaging layer. Thus, for example, if a one-sided image forming medium is desired, the image forming medium may include a supporting substrate, coated or impregnated on one side with the imaging layer and coated on the other side with an opaque layer such as, for example, a white layer. Also, the image forming medium may include a supporting substrate, coated or impregnated on one side with the imaging layer and with an opaque layer between the substrate and the imaging layer. If a two-sided image forming medium is desired, then the image forming medium may include a supporting substrate, coated or impregnated on both sides with the imaging layer, and with at least one opaque layer interposed between the two coated imaging layers. Of course, an opaque supporting substrate, such as conventional paper, may be used in place of a separate supporting substrate and opaque layer, if desired.

Any suitable supporting substrate may be used. Suitable examples of supporting substrates include, but are not limited to, glass, ceramics, wood, plastics, paper, fabrics, textile products, polymeric films, inorganic substrates such as metals, and the like. Suitable plastics may be, for example, a plastic film, such as polyethylene film, polyethylene terephthalate, polyethylene naphthalate, polystyrene, polycarbonate, polyethersulfone. The paper may be, for example, plain paper such as XEROX® 4024 paper, ruled notebook paper, bond paper, silica coated papers such as Sharp Company silica coated paper, Jujo paper, and the like. The substrate may be a single layer or multi-layer, where each layer is the same or a different material. In embodiments, the substrate may have a thickness of from about 0.5 mm to about 5 mm, in embodiments from about 0.3 mm to about 1 mm.

In embodiments where the composition is coated on, or impregnated into, the substrate, the coating can be applied by any suitable method within the purview of those skilled in the art (e.g., printing or coating). Exemplary printing methods can include inkjet printing, lithographic or offset printing, flexographic printing, screen printing, stencil printing, stamping, micro-contact printing, gravure, combinations thereof, and the like. Exemplary coating methods can include spin coating, blade coating, rod coating, dip coating, combinations thereof, and the like.

In embodiments, an overcoat layer can be applied over the dried photochromic layer. The overcoat layer can be applied, for example, to further adhere the underlying layer to the substrate, to provide wear resistance, and to improve the appearance and feel of the image forming medium. The overcoat layer can be the same as, or different from, the substrate material, although in embodiments at least one of the overcoat layer and substrate layer can be clear and transparent to permit visualization of the image to be formed. The overcoat layer can have a thickness of, for example, from about 0.001 mm to about 10 mm, in embodiments from about 0.1 mm to about 5 mm, in embodiments from about 0.1 mm to about 4 mm. For example, the coated substrate can be laminated between supporting sheets such as plastic sheets. In embodiments, the overcoat layer can be applied using a method similar to the liquid composition used to form the photochromic layer.

In embodiments, where the photochromic polymer is mixed with a solvent and then applied to the substrate, and the solvent system is retained in the final product, additional processing may be utilized. As a result, where the photochromic polymer is simply coated on the substrate, a cover material may be applied over the solvent system to constrain the solvent system in place on the substrate. In embodiments, the cover material can be a solid layer, such as any of the suitable materials disclosed above for the substrate layer. In an alternative embodiment, a polymer material or film may be applied over the photochromic polymer, where the polymer film penetrates the photochromic polymer at discrete points to form pockets or cells of imaging material that are bound on the bottom by the substrate and on the sides and top by the polymeric material. The height of the cells may be from about 1 micron to about 1000 microns. The cells can be any shape, for example square, rectangle, circle, polygon, combinations thereof, and the like. In embodiments, the cover material is advantageously transparent and colorless, to provide the full color contrast effect provided by the photochromic polymer.

In other embodiments, the solvent system with the photochromic polymer can be encapsulated or microencapsulated, and the resultant capsules or microcapsules deposited or coated on the substrate as described above. Any suitable encapsulation technique can be used, such as simple and complex coacervation, interfacial polymerization, in situ polymerization, phase separation processes, combinations thereof, and the like. For example, a suitable method is described for ink materials in U.S. Pat. No. 6,067,185, the entire disclosure of which is incorporated herein by reference and can be readily adapted to the present disclosure. Useful exemplary materials for simple coacervation include gelatin, polyvinyl alcohol, polyvinyl acetate and cellulose derivatives, and the like. Exemplary materials for complex coacervation include gelatin, acacia, carageenan, carboxymethylcellulose, agar, alginate, casein, albumin, methyl vinyl ether-co-maleic anhydride, and the like. Exemplary useful materials for interfacial polymerization include diacyl chlorides such as sebacoyl, adipoyl, and di or poly-amines or alcohols, isocyanates, and the like. Exemplary useful materials for in situ polymerization include, for example, polyhydroxyamides, with aldehydes, melamine or urea and formaldehyde; water-soluble oligomers of the condensate of melamine or urea and formaldehyde, and vinyl monomers such as for example styrene, methyl methacrylate, acrylonitrile, combinations thereof, and the like. Exemplary useful materials for phase separation processes include polystyrene, polymethylmethacrylate, polyethylmethacrylate, ethyl cellulose, polyvinyl pyridine, polyacrylonitrile, combinations thereof, and the like. In these embodiments, the encapsulating material is also transparent and colorless, to provide the full color contrast effect provided by the photochromic material.

Where the photochromic polymer is encapsulated, the resultant capsules may have any desired particle size. For example, suitable results can be obtained with capsules having an average size of from about 2 to about 1000 microns, in embodiments from about 10 to about 800 microns, in embodiments from about 20 to about 100 microns, where the average size refers to the average diameter of the microcapsules and can be readily measured by any suitable device such as an optical microscope. For example, in embodiments, the capsules are large enough to hold a suitable amount of photochromic material to provide a visible effect when in the colored form, but are not so large as to prevent desired image resolution.

Imaging Methods

The disclosed erasable media can be imaged at or above the glass transition temperature of the photochromic polymer to achieve maximum optical density. By tuning the glass transition temperature (Tg) of the photochromic polymer, the photochromic composite can be made to have an extended lifetime for the colored (or imaged) state with little reduction in color contrast, relative to the background areas. Therefore, various embodiments can provide an erasable medium that eliminates the need for a protective yellow film (or dye-based top coating). (Yellow films are often applied on conventional erasable media containing spiropyran monomers. Although the yellow film provides protection, it also creates imaging problems including low optical densities during writing and adds additional costs and processes.) The disclosed erasable medium can provide better reusability and initial writability having a high optical density as compared with conventional erasable media.

The present disclosure also provides a method for forming an imaging layer on a substrate, the imaging layer including a photochromic polymer dispersed in a solvent or another polymeric binder, wherein the imaging composition is imagable by light and heat and erasable in a short time period by applying elevated temperatures, and exhibits a reversible transition between a colorless and a colored state. To provide separate writing and erasing processes, imaging is conducted by applying to the imaging material a first stimulus, such as irradiation with UV light at a specific range of temperatures, to cause a color change. Suitable temperatures for the writing process are from about 30° C. to about 150° C., in embodiments from about 40° C. to about 100° C.

Erasing may be conducted by applying a second, different stimulus, such as applying elevated temperatures, to the imaging material to reverse the color change in a short time period. In embodiments, the temperature for the erasing process may be from about 70° C. and above, in embodiments from about 70° C. to about 200° C., in embodiments from about 80° C. to about 150° C.

In a writing process, the image forming medium is exposed to an imaging light having an appropriate activating wavelength, such as a UV light source, in an image-wise fashion. The imaging light supplies sufficient energy to the photochromic material to cause the photochromic material to convert, such as isomerize, from a clear state to a colored state, to produce a colored image at the imaging location, and for the photochromic material to isomerize to stable isomer forms to lock-in the image, that is, to form a stable image. The amount of energy irradiated on a particular location of the image forming medium can affect the intensity or shade of color generated at that location. Thus, for example, a weaker intensity image can be formed by delivering a lesser amount of energy at the location and thus generating a lesser amount of colored photochromic unit, while a stronger intensity image can be formed by delivering a greater amount of energy to the location and thus generating a greater amount of colored photochromic unit. When suitable photochromic material, solvent or polymer binder, and irradiation conditions are selected, the variation in the amount of energy irradiated at a particular location of the image forming medium can thus allow for formation of grayscale images, while selection of other suitable photochromic materials can allow for formation of full color images.

Once an image is formed by the writing process, the formation of stable isomers of the photochromic material within the imaging materials locks-in the image. That is, the isomer forms of the selected photochromic materials are more stable at ambient heat and light, and thus exhibit greater long-term stability. The image is thereby "frozen" or locked-in, and cannot be readily erased in the absence of a specific second stimuli such as applying elevated temperatures, particularly in a short time period. In embodiments, the image is locked-in, and requires elevated temperature and/or light in order to revert back to its colorless state. The imaging substrate thus provides a reimagable substrate that exhibits a long image lifetime, but can be erased as desired and reused for additional imaging cycles.

Various embodiments can also include a method for writing on and erasing the disclosed erasable medium. For example, a transient image can be written in or on the photochromic layer of the erasable medium and can then be erased from the imaged erasable medium. In embodiments, the erasable medium can be reused to undergo a number of cycles of temporary image formation and temporary image erasure. For example, the erasable medium can be reused at least about 10 times, in embodiments at least about 30 times, in other embodiments at least about 50 times. In embodiments the medium can be reused from about 10 to about 100 times, in embodiments from about 30 to about 50 times.

The erasable medium can be exposed to a first stimulus, e.g., a writing stimulus, in an image-wise manner to form a visible image. The first stimulus for writing can be, for example, both a radiant energy such as UV light at a wavelength of from about 200 nm to about 475 nm, in embodiments from about 350 nm to about 370 nm, and a temperature from about 30° C. to about 150° C., in embodiments from about 40° C. to about 100° C.

The radiant energy for writing can be any suitable predetermined wavelength, for example, a single wavelength or a band of wavelengths. In embodiments, the radiant energy for writing, for example an ultraviolet (UV) light, can have a single wavelength or a narrow band of wavelengths from about 200 nm to about 475 nm, such as a single wavelength at about 365 nm. For imaging, the erasable medium can be exposed to the radiant energy for a time period ranging from about 10 milliseconds to about 5 minutes, in embodiments from about 30 milliseconds to about 4 minutes, in embodiments from about 50 milliseconds to about 1 minute. The exemplary UV light can have an intensity ranging from about 0.1 mW/cm$^2$ to about 100 mW/cm$^2$, in embodiments from about 0.5 mW/cm$^2$ to about 40 mW/cm$^2$, in embodiments from about 1 mW/cm$^2$ to about 5 mW/cm$^2$.

In embodiments, UV light corresponding to the image can be generated by a radiant source, for example, by a LED (light emitting diode) array screen, and the image can be formed on the erasable medium by placing the medium on the LED screen for a desired period of time. In other embodiments, a UV raster output scanner (ROS) or a UV laser diode (LD) can be used to generate the UV light to sensitize the photochromic polymer from a colorless state to a colored state.

The erasing process causes the isomerizations to reverse and the photochromic unit to convert, such as isomerize, from a colored state to a clear state, thereby erasing the previously formed image at the imaging location in a short time period. The erasing procedure can be on an image-wise fashion or on the entire imaging layer as a whole, as desired.

In embodiments, the erasable medium bearing the image, i.e., the imaged erasable medium, can be erased by removing color contrast between a non-exposed region and an exposed region.

In embodiments, erasure of the image can occur by any of the following: (i) changing the color of the region exposed to the writing stimulus to the color of the region not exposed to the writing stimulus; (ii) changing the color of the non-exposed region to the color of the exposed region; or (iii) changing the color of the exposed region and the color of the non-exposed region to the same color, but a color that is different from both the exposed region color and the non-exposed region color.

In embodiments, the imaged medium can be erased by applying an erasing stimulus including, for example, heat and/or an erasing irradiation at a wavelength of visible light. In embodiments, the imaged medium can be erased in an erase-on-demand manner. For example, the imaged medium can be selectively exposed to heat. The exposed region can change from the colored state to the colorless state, thus becoming erased, at a temperature of about 70° C. or above, by a radiant energy source or a heat source, such as infrared (IR) irradiation generating heat, a hotplate, or the like. In embodiments, the temperature used for erasing can be at least about 70° C., for example, from about 70° C. to about 200° C., in embodiments from about 80° C. to about 150° C.

Erasing light may be visible light of a wavelength which overlaps with the absorption spectrum of the colored state isomer in the visible region. For example, the erasing light may have a wavelength of from about 400 nm to about 790 nm, in embodiments from about 500 nm to about 800 nm. The light may be generated by a Xenon light source with a bulb having a power from about 5 W to about 1000 W, in embodiments from about 20 W to about 200 W, which is placed in the proximity of the areas of the document to be erased. Another suitable erasing light source is an LED having a wavelength in the visible region of the light spectrum, as defined above. The erasing light may have a single wavelength or a narrow band of wavelengths.

In embodiments, erasing can be conducted at particular points on the substrate, such as by using a light pen and focused heat source, or the like.

The color contrast that renders the image visible to an observer can be a contrast between, for example, two, three, or more different colors. The term "color" can encompass a number of aspects such as hue, lightness and saturation, where one color may be different from another color if the two colors differ in at least one aspect. For example, two colors having the same hue and saturation, but that are different in lightness, can be considered different colors. Any suitable color, for example, red, white, black, gray, yellow and/or purple, can be used to produce a color contrast as long as the image is visible to the naked eye of a user. In embodiments, the following color contrasts can be used: purple image on a white background; yellow image on a white background; dark purple image on a light purple background; or light purple image on a dark purple background.

In embodiments, use of the disclosed photochromic composite, i.e., the disclosed photochromic/binder combination, can provide images on the erasable media with both a long lifetime and a long readability. In embodiments, the disclosed erasable medium can have reduced background coloration to further extend the lifetime of the color contrast between the formed or written image and the background areas.

As disclosed herein, the term "lifetime" refers to an amount of time required for the photochromic polymer in a colored state to fully revert or transition back to the colorless state in an ambient condition, or to change the color contrast to the absence of color contrast between the image and the background areas.

As used herein, the term "ambient condition" refers to atypical indoor ambient environment including a light condition that has a light wavelength of from about 380 nm to about 750 nm at room temperature i.e., from about 20° C. (68° F.) to about 28° C. (77° F.).

In embodiments, the color contrast of the image formed in/on the erasable medium can be maintained for a period of time so as to be readable or recognized by an observer under ambient conditions, even though the color contrast may change, for example, it can diminish during the visible time.

As used herein, the term "readability" or "visibility" of an image encompasses any degree of color contrast, between the image formed in/on the disclosed photochromic layer of erasable media and the surrounding background areas, sufficient to render the image discernable to an observer or user, regardless of whether the color contrast changes or is constant during the visible time.

In embodiments, the "readability" of an image formed in/on the disclosed photochromic layer can be determined by a difference ($\Delta$) in optical density (OD) value between the image (ODimage) and the surrounding background areas (ODbackground). For example, the image formed in/on the disclosed photochromic layer can be "readable" and have a $\Delta$OD value of about 0.05 or more. In embodiments, the formed image can be "readable" having a $\Delta$OD value of about 0.1 or more, in embodiments about 0.2 or more.

In embodiments, the image written in/on the disclosed photochromic layer can be "readable" under ambient conditions for a period of time of at least about one day (24 hours), in embodiments for at least about 3 days, in embodiments at least about 3 weeks.

In addition to providing long image lifetime and long image readability, use of the disclosed photochromic/binder combination can enable the erasable media to have good writability and reusability. For example, the disclosed erasable medium can have an initial $\Delta$OD of from about 0.50 to about 1.5, in embodiments from about 0.75 to about 1.2, indicating an increased initial writability of the disclosed photochromic layer. In embodiments, the disclosed erasable medium can maintain from about 30% to about 90% of initial image quality (initial $\Delta$OD) after from about 3 days to about 10 days, in embodiments from about 35% to about 80% initial $\Delta$OD after from about 5 days to about 7 days. Further, the disclosed erasable medium can be re-used from about 10 times to about 100 times, in embodiments from about 30 times to about 50 times.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

Solution Polymerization of Photochromic Spiropyran Polymer (SP-BPA-C6) in the Presence of 4-(dimethylamino)pyridine SP-BPA-C6 was prepared according to the following scheme:

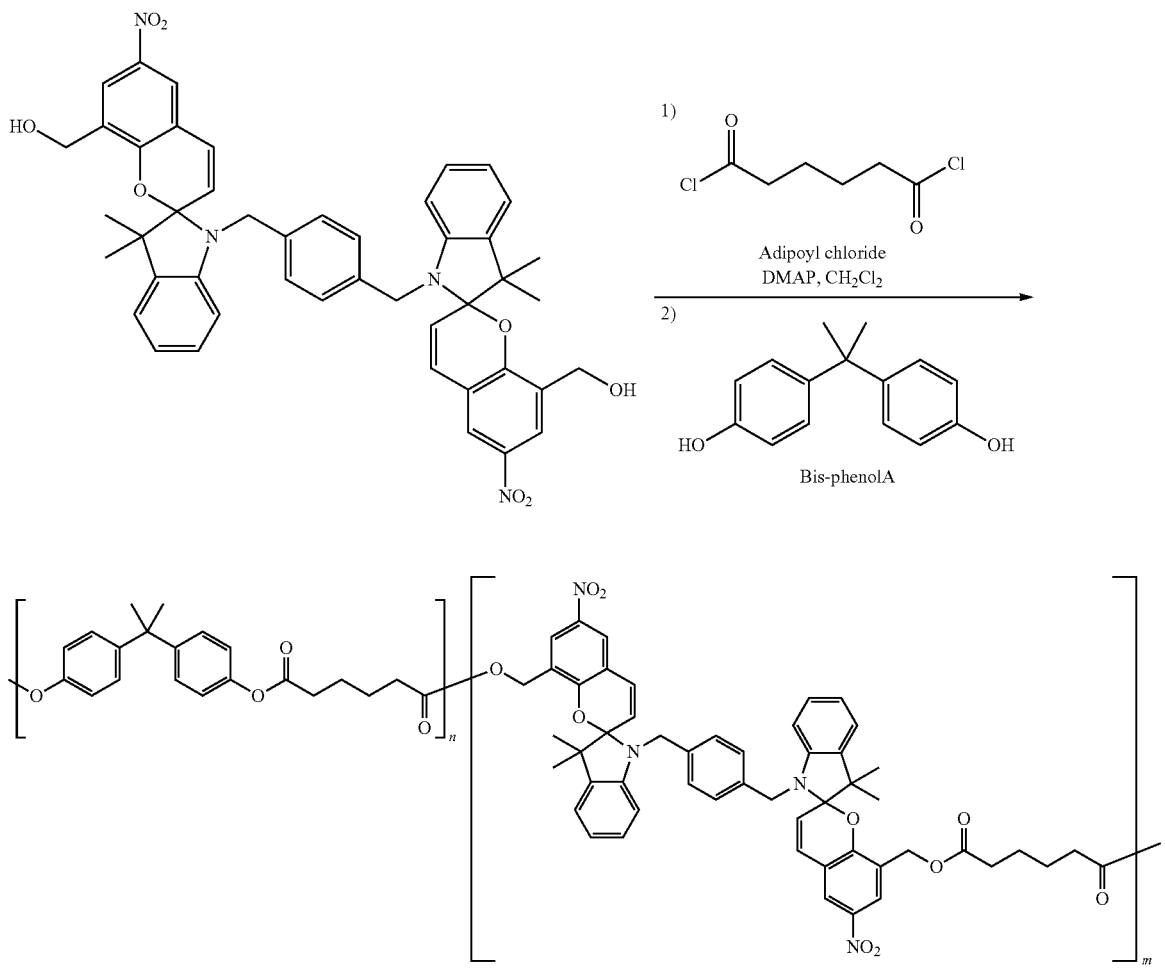

About 3.5 grams of adipoyl chloride was dissolved in about 45 ml of dry dichloromethane (DCM). About 1.5 grams of bis-hydroxymethyl photochrome and about 0.47 grams of 4-(dimethylamino)pyridine (DMAP) dissolved in about 5 ml of dry DCM were slowly added to the adipoyl chloride solution. The reaction mixture was stirred at room temperature for about 30 minutes.

Separately, about 4 grams of bisphenol A (BPA) and about 4.5 grams of DMAP were dissolved in about 10 ml of dry DCM. The BPA solution was slowly added to the above reaction mixture in an ice bath. After the addition, the combined solution was removed from the ice bath and the reaction mixture was stirred at room temperature for about 2 hours.

Resulting DMAP salt was removed by filtration and the filtrate was washed with water three times. The organic layer was dried over magnesium sulfate and the solution was concentrated. The solution was dropped into stirring hexane and stirred overnight. The resulting precipitates were collected by filtration and dried under vacuum. The molecular weight of the product was about 23,300, polydispersity index of about 2.63, and the glass transition temperature was about 77° C.

Example 2

Solution Polymerization of Binder Polymer (BPA-C6) in the Presence of 4-(dimethylamino)pyridine About 87 grams of BPA and about 93 grams of DMAP were dissolved in about 850 ml of dry DCM. About 70 grams of adipoyl chloride in about 140 ml of dry DCM were slowly added to the BPA solution in an ice bath. After the addition, the solution was removed from the ice bath and the reaction mixture was stirred at room temperature for about 2 hours. Resulting DMAP salt was removed by filtration and the filtrate was washed with water two times. The organic layer was dried over magnesium sulfate and the solution was concentrated. The solution was dropped into stirring hexane and stirred overnight. Resulting presipitates were crushed into small pieces and dried by vacuum. The product had a molecular weight of about 15,200, a polydispersity index of about 2.48 and a glass transition temperature of about 60° C.

Example 3

Solution Polymerization of Photochromic Spiropyran Polymer (SP-BPA-C6) in the Presence of Triethylamine SP-BPA-C6 was prepared according to the following scheme:

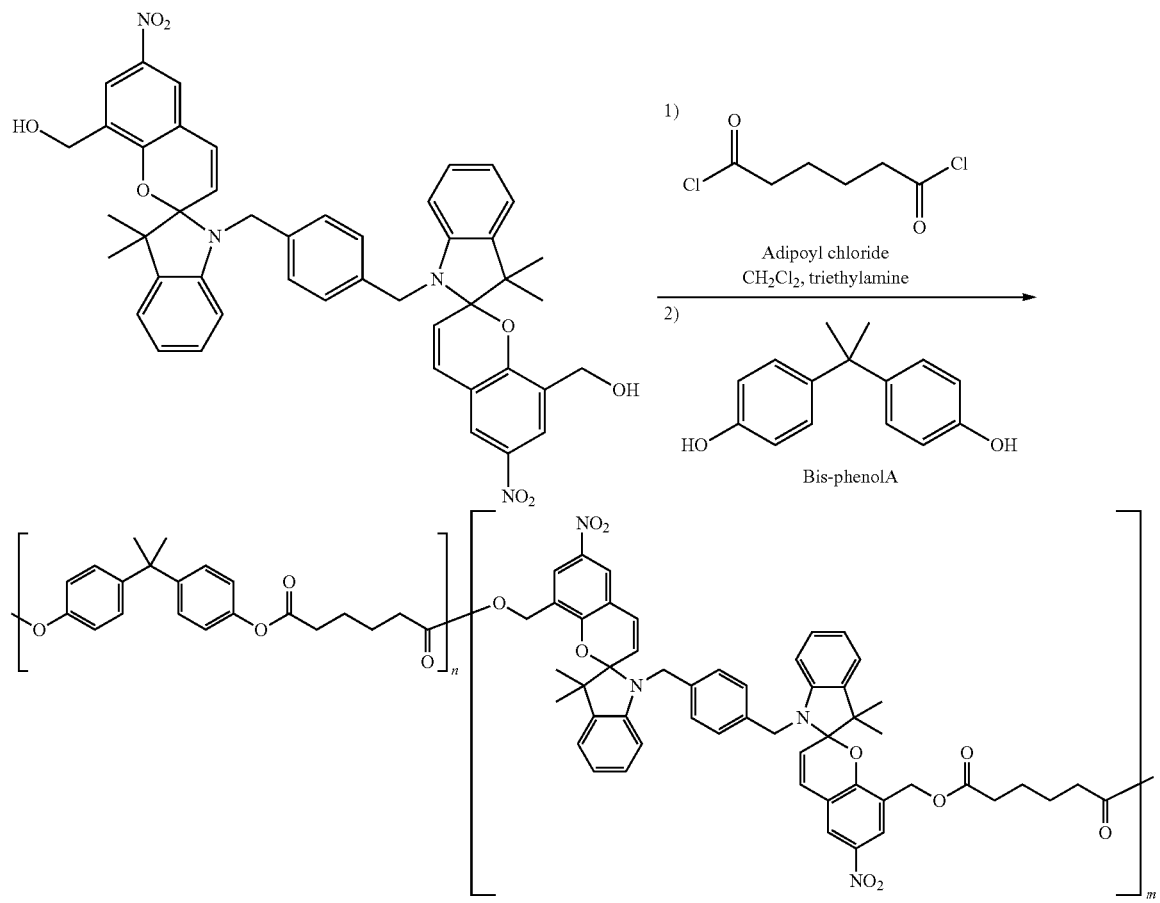

SP-BPA-C6 material was synthesized by solution polymerization in two steps using triethylamine as a base. The monomer molar ratio of photochromic spiropyran monomer, bisphenol A and adipoyl chloride was 10/90/100 (10 mol % of photochromic spiropyran monomer).

About 3.5 grams (g) of adipoyl chloride was dissolved in about 45 ml of dry dichloromethane (DCM). About 1.5 grams of bis-hydroxymethyl photochrome and about 0.39 grams of triethylamine was dissolved in about 5 ml of dry DCM and were slowly added to the adipoyl chloride solution. The reaction mixture was stirred at room temperature for about 30 minutes.

Separately, about 4 grams of bisphenol A (BPA) and about 3.7 grams of triethylamine were dissolved in about 10 ml of dry DCM. The BPA solution was slowly added to the above reaction mixture in an ice bath. After the addition, the combined solution was removed from the ice bath and the reaction mixture was stirred at room temperature for about 2 hours.

Resulting triethylamine salt was removed by filtration and the filtrate was washed with water three times. The organic layer was dried over magnesium sulfate and the solution was concentrated. The solution was dropped into stirring hexane and stirred overnight. The resulting precipitates were collected by filtration and dried under vacuum. The molecular weight of the product was about 5,200, polydispersity index of about 2.86, and the glass transition temperature was about 53° C.

Example 4

Solution Polymerization of Binder Polymer (BPA-C6) in the Presence of Triethylamine BPA-C6 material was synthesized by solution polymerization in two steps using triethylamine as a base. The resulting product had a molecular weight of about 3,300, a polydispersity index of about 2.11, and a glass transition temperature of about 37° C.

About 25 grams of BPA and about 22 grams of triethylamine were dissolved in about 280 ml of dry DCM. About 20 grams of adipoyl chloride dissolved in about 40 ml of dry DCM were slowly added to the BPA solution in an ice bath. After the addition, the solution was removed from the ice bath and the reaction mixture was stirred at room temperature for about 2 hours. Resulting triethylamine salt was removed by filtration and the filtrate was washed with water three times. The organic layer was dried over magnesium sulfate and the solution was concentrated. The solution was dropped into stirring hexane and stirred overnight. Resulting presipitates were crushed into small pieces and dried by vacuum. The product had a molecular weight of about 3,300, a polydispersity index of about 2.11 and a glass transition temperature of about 37° C.

Example 5

Interfacial Polymerization of Photochromic Spiropyran Polymer (SP-BPA-C6)

The bis-hydroxymethyl photochrome monomer was reacted with adipoyl chloride (dissolved in dichloromethane and triethylamine), then polymerized with BPA dissolved in an aqueous sodium hydroxide solution in the presence of ALIQUAT 336 as a catalyst to form a photochromic polyester, having a molecular weight of about 5,500, a polydispersity index of about 2.63 and a glass transition temperature of about 46° C.

Example 6

Interfacial Polymerization of Binder Polymer (BPA-C6)

About 17 grams of bisphenol A and about 7.5 grams of sodium hydroxide were dissolved in about 120 ml of water. About 0.9 grams of ALIQUAT 336 in about 60 ml of DCM was added and the solution was cooled with an ice bath. About 15 grams of pimeloyl chloride in about 50 ml of DCM was then slowly added and the reaction mixture was stirred at room temperature for about 2 hours. Resulting gum was dissolved in DCM and precipitated in hot water to obtain BPA-C6 binder polymer having a molecular weight of about 81,400 and a polydispersity index of about 14.19 and a glass transition temperature of about 58° C.

Example 7

Interfacial Polymerization of Photochromic Spiropyran Polymer (SP-BPA-C7)

The bis-hydroxymethyl photochrome monomer was reacted with pimeloyl chloride (dissolved in dichloromethane and triethylamine), then polymerized with bisphenol A dissolved in an aqueous sodium hydroxide solution in the presence of ALIQUAT 336 as a catalyst to form a photochromic polyester having a glass transition temperature of about 51° C.

Example 8

Solution Polymerization of Binder Polymer (BPA-C7) in the Presence of Triethylamine About 81 grams of bisphenol A and about 100 ml of triethylamine were dissolved in about 860 ml of dichloromethane (DCM) and the solution was cooled with an ice bath. About 70 grams of pimeloyl chloride in about 140 ml of DCM was then slowly added and the reaction mixture was stirred at room temperature for about 2 hours. The reaction mixture was washed with water and dried over magnesium sulfate. After the solvent was distilled off, the concentrated solution was precipitated in hexane to obtain BPA-C7 binder polymer.

Example 9

Writability and Image Lifetime Measurements of Photochromic Polyesters

The photochrome polymer of Examples 1 and 7 in combination with the binder of Examples 2 and 8, respectively, were coated on a paper substrate and evaluated for writability and image lifetime for three days under office lighting conditions of 400 lux. Table 1 illustrates the writability and image lifetime of the SP-BPA-C6 and BPA-C6 of Examples 1 and 2, respectively, compared with the properties of the CP-BPA-C7 and BPA-C7 of Examples 7 and 8 formed using pimeloyl chloride.

The ΔOD values were averaged for each sample set. The sample set of the photochromic/binder polymer pair made from the adipoyl monomer exhibited very similar performance to the sample set of the photochromic/binder polymer pair made from the pimeloyl monomer.

The adipoyl monomer is less expensive than the pimeloyl monomer, thus minimizing the cost of producing the photochromic composite. As shown in Table 1, substitution of a cheaper monomer has little effect on the structure and performance of the photochromic composite. In fact, the image lifetime was improved by the substitution of the adipoyl monomer for the pimeloyl monomer.

It will be appreciated that various of the above-disclosed and other features and functions, or alternatives thereof, may be desirably combined into many other different systems or

TABLE 1

| Composition | | Writability* | Image Lifetime for 3 days** | | |
|---|---|---|---|---|---|
| Material Type | Name | ΔOD (0) [Std. dev.] | ΔOD (3 Days) [Std. dev.] | % of initial OD (3 days) | OD Bkg (0) [conditioned] |
| Polychromic polymer | SP-BPA-C6 (Example 1) | 0.88 [0.025] | 0.62 [0.015] | 70% | 0.27 |
| Binder polymer | BPA-C6 (Example 2) | | | | |
| Polychromic polymer | SP-BPA-C7 (Example 7) | 0.9 | 0.56 | 62% | 0.23 |
| Binder polymer | BPA-C7 (Example 8) | | | | |

*Written with UV LED at 65° C.
**Under 400 lux flourescent lamp at room temperature.

applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

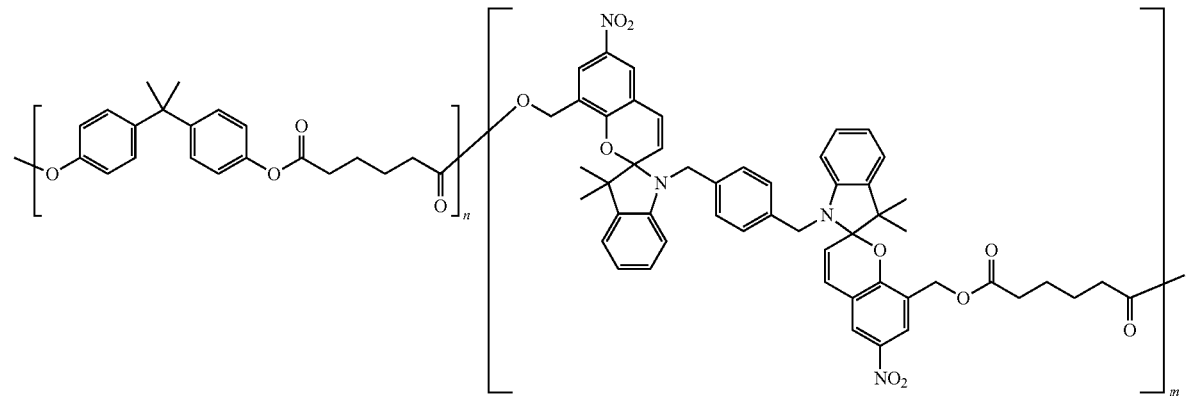

wherein m is from about 1 to about 1000, and n is from about 0 to about 1000.
15. A process according to claim 11, wherein the at least one photochromic monomer has the following formula:
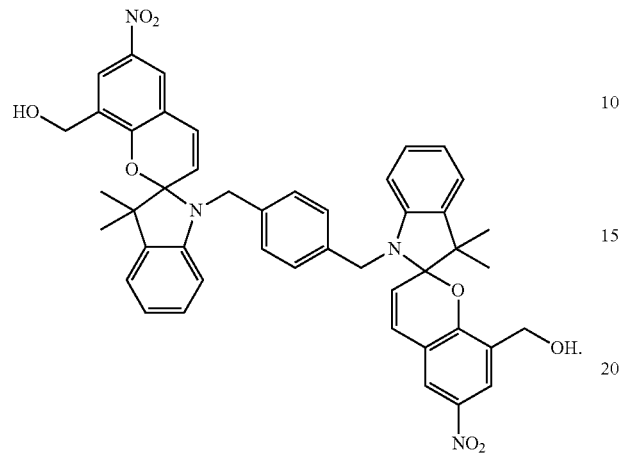

What is claimed is:

1. A process comprising:
   contacting a first monomer with at least one photochromic monomer in a first solvent in the presence of a first base to form at least one polymer precursor; and
   contacting a second monomer with the at least one polymer precursor in a second solvent in the presence of a second base to form a photochromic polymer,
   wherein the first base and the second base are the same or different and are selected from the group consisting of pyridine, 1,8-Diazabicyclo[5.4.0]undec-7-ene and 4-(dimethylamino)pyridine, wherein the first solvent and the second solvent are the same or different and are selected from the group consisting of dichloromethane, chloroform, tetrachloromethane, benzene, toluene, and xylene; and wherein the second monomer is selected from the group consisting of bisphenols, diols, and combinations thereof.

2. A process according to claim 1, wherein the first monomer is selected from the group consisting of diacyl chlorides, diacids, dimethyl esters of diacids, and anhydrous cyclic esters of diacids, wherein an alkyl portion of the diacid can be straight, branched or cyclic, saturated or unsaturated, substituted or unsubstituted, having from 1 to about 40 carbon atoms, or an substituted or unsubstituted aromatic or heteroaromatic group.

3. A process according to claim 1, wherein the second monomer is selected from the group consisting of bisphenol A, bisphenol B, bisphenol C, bisphenol F, bisphenol M, bisphenol P, bisphenol AP, bisphenol Z, ethylene glycol, propylene glycol, butylene glycol, pentylene glycol, hexylene glycol, heptylene glycol, diethylene glycol, dipropylene glycol, cyclohexyldimethanol, bisphenol A ethoxylate, bisphenol A propoxylate and combinations thereof.

4. A process according to claim 1, wherein the at least one photochromic monomer is selected from the group consisting of spiropyrans, spirooxazines, chromenes, spirodihydroindolizines, spiroperimidines, azobenzenes, thioindigos, thiospiropyrans, benzos, stilbenes, bisimidazols, quinines, perimidinespirocyclohexadienones, viologens, fulgides, fulgimides, diarylethenes, hydrazines, anils, aryl thiosulfonates, and combinations thereof.

5. A process according to claim 1, wherein the at least one photochromic polymer is a random or block copolymer having the following general formula:

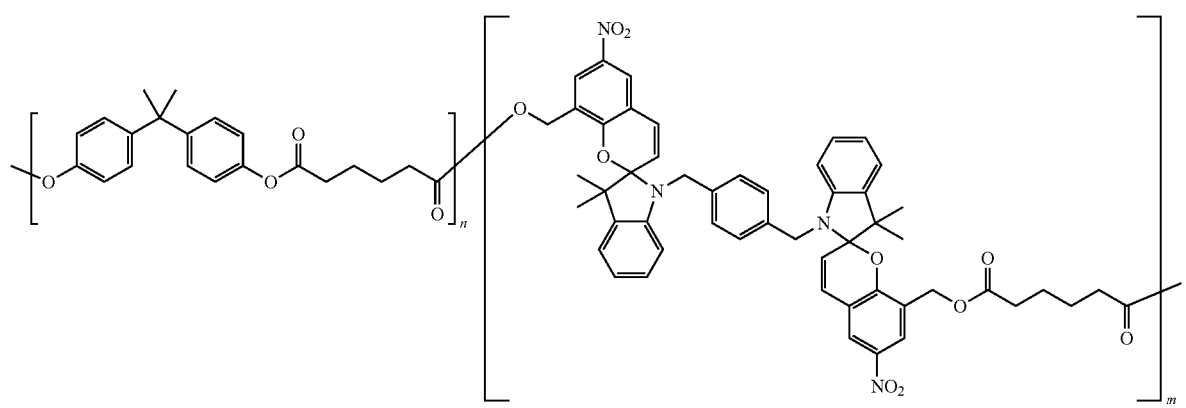

wherein m is from about 1 to about 1000, and n is from about 0 to about 1000.

6. A process according to claim 1, wherein the at least one photochromic monomer has the following formula:

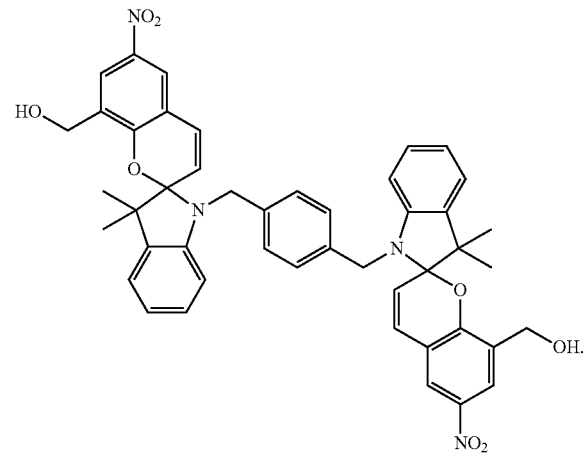

7. A process comprising:

contacting a first monomer with a photochromic monomer in a first solvent in the presence of a first base to form a polymer precursor;

contacting a second monomer with the polymer precursor in a second solvent in the presence of a second base to form a photochromic polymer;

forming a binder polymer from the first monomer and the second monomer; and combining the photochromic polymer and the binder polymer to form a photochromic composite, wherein the first base and the second base are the same or different and are selected from the group consisting of pyridine, 1,8-Diazabicyclo[5.4.0]undec-7-ene and 4-(dimethylamino)pyridine, wherein the first solvent and the second solvent are the same or different and are selected from the group consisting of dichloromethane, chloroform, tetrachloromethane, benzene, toluene, and xylene; and wherein the second monomer is selected from the group consisting of bisphenols, diols, and combinations thereof.

8. A process according to claim 7, wherein the first monomer is selected from the group consisting of diacyl chlorides, diacids, dimethyl esters of diacids, and anhydrous cyclic esters of diacids, wherein the alkyl portion of the diacid can be straight, branched or cyclic, saturated or unsaturated, substituted or unsubstituted, having from 1 to about 40 carbon atoms, or an substituted or unsubstituted aromatic or heteroaromatic group.

9. A process according to claim 7, wherein the second monomer is selected from the group consisting of bisphenol A, bisphenol B, bisphenol C, bisphenol F, bisphenol M, bisphenol P, bisphenol AP, bisphenol Z, ethylene glycol, propylene glycol, butylene glycol, pentylene glycol, hexylene glycol, heptylene glycol, diethylene glycol, dipropylene glycol, cyclohexyldimethanol, bisphenol A ethoxylate, bisphenol A propoxylate and combinations thereof.

10. A process according to claim 7, wherein the photochromic polymer is a random or block copolymer having the following general formula:

wherein the first solvent and the second solvent are the same or different and are selected from the group consisting of dichloromethane, chloroform, tetrachloromethane, benzene, toluene, and xylene; and wherein the second monomer is selected from the group consisting of bisphenols, diols, and combinations thereof.

12. A process according to claim 11, wherein the monomer is selected from the group consisting of bisphenol A, bisphenol B, bisphenol C, bisphenol F, bisphenol M, bisphenol P, bisphenol AP, bisphenol Z, ethylene glycol, propylene glycol, butylene glycol, pentylene glycol, hexylene glycol, heptylene glycol, diethylene glycol, dipropylene glycol, cyclohexyldimethanol, bisphenol A ethoxylate, bisphenol A propoxylate and combinations thereof.

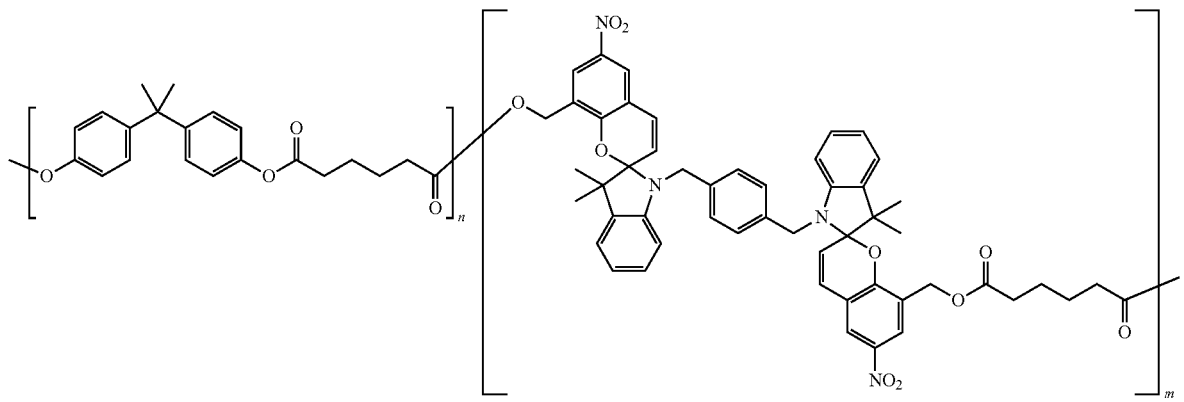

wherein m is from about 1 to about 1000, and n is from about 0 to about 1000.

11. A process comprising:
contacting adipoyl chloride with at least one photochromic monomer in a first solvent in the presence of a first base to form at least one polymer precursor; and
contacting a monomer with the at least one polymer precursor in a second solvent in the presence of a second base to form a photochromic polymer,
wherein the first base and the second base are the same or different and are selected from the group consisting of pyridine, 1,8-Diazabicyclo[5.4.0]undec-7-ene and 4-(dimethylamino)pyridine, 13. A process according to claim 11, wherein the at least one photochromic monomer is selected from the group consisting of spiropyrans, spirooxazines, chromenes, spirodihydroindolizines, spiroperimidines, azobenzenes, thioindigos, thiospiropyrans, benzos, stilbenes, bisimidazols, quinines, perimidinespirocyclohexadienones, viologens, fulgides, fulgimides, diarylethenes, hydrazines, anils, aryl thiosulfonates, and mixtures thereof.

14. A process according to claim 11, wherein the at least one photochromic polymer is a random or block copolymer having the following general formula: